United States Patent [19]
Yagi et al.

[11] Patent Number: 4,756,008
[45] Date of Patent: Jul. 5, 1988

[54] DIGITIZED QUADRATURE PHASE SHIFT KEYING MODULATOR

[75] Inventors: Kazuo Yagi; Tadayuki Kamisaka, both of Yokohama, Japan

[73] Assignee: Hitachi, Ltd., Tokyo, Japan

[21] Appl. No.: 15,014

[22] Filed: Feb. 17, 1987

[30] Foreign Application Priority Data

Mar. 3, 1986 [JP] Japan .................................. 61-43965
Mar. 3, 1986 [JP] Japan .................................. 61-43966

[51] Int. Cl.⁴ ........................................... H04L 27/10
[52] U.S. Cl. .................................... 375/54; 332/16 R
[58] Field of Search ....................... 375/39, 52, 62, 54; 332/16 R, 21; 455/615

[56] References Cited

U.S. PATENT DOCUMENTS

| | | | |
|---|---|---|---|
| 3,787,785 | 1/1974 | Bass | 375/67 |
| 3,935,386 | 1/1976 | Glasson et al. | 375/67 |
| 4,003,001 | 1/1977 | Jones, Jr. | 332/16 R |
| 4,404,532 | 9/1983 | Welti | 332/21 |
| 4,613,976 | 9/1986 | Sawerinson et al. | 332/16 R |
| 4,626,803 | 12/1986 | Holm | 332/21 |

FOREIGN PATENT DOCUMENTS 54-133019 10/1979 Japan.
59-207768 11/1984 Japan.

OTHER PUBLICATIONS

Boutin et al, "A Digital Filter-Modulation Combination for Data Transmission", IEEE Tran. on Communications, vol. COM 25, No. 10, Oct. 1977, pp. 1242-1244.

Primary Examiner—Michael A. Masinick
Assistant Examiner—Stephen Chin
Attorney, Agent, or Firm—Antonelli, Terry & Wands

[57] ABSTRACT

A digitized quadrature phase shift keying modulator capable of making the modulation output frequency variable and sufficing a single ROM of waveform shaping digital filter with look-up table by using interpolators which re-sample waveforms of impulse response of each of the output I data and Q data from the digital filter to change the sampling rate and extractors for extracting the interpolated I data and Q data so that samples of each of the interpolated I data and Q data occur sequentially and alternately at different timings.

7 Claims, 5 Drawing Sheets

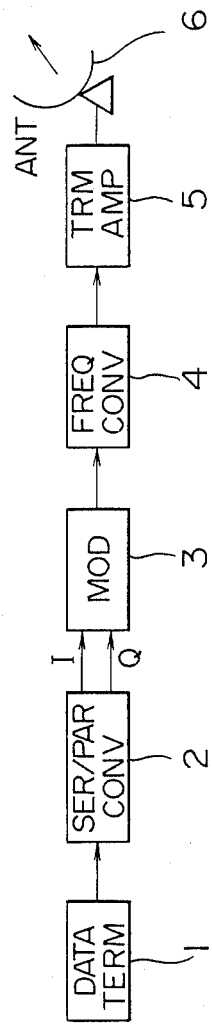
F I G. 1
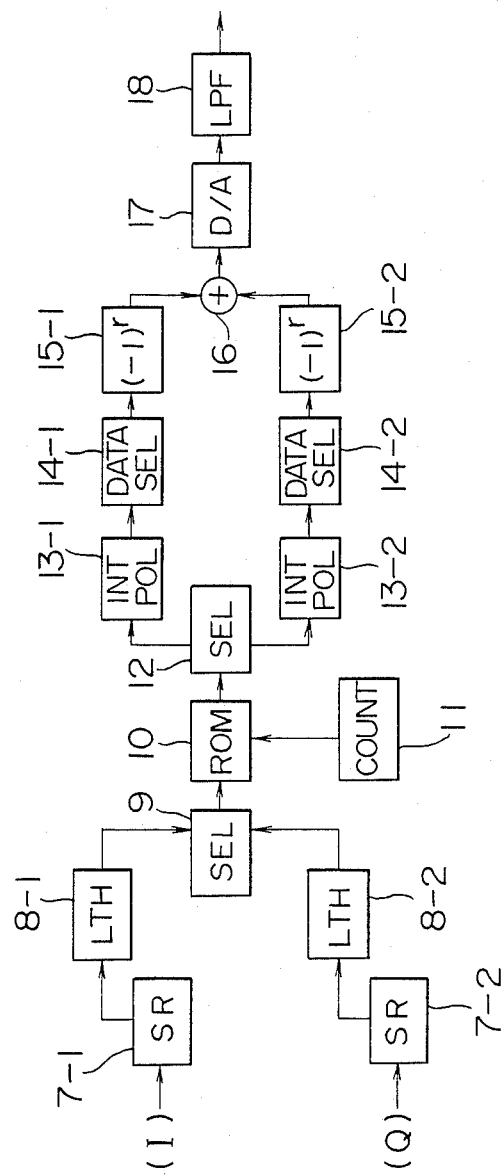
F I G. 2

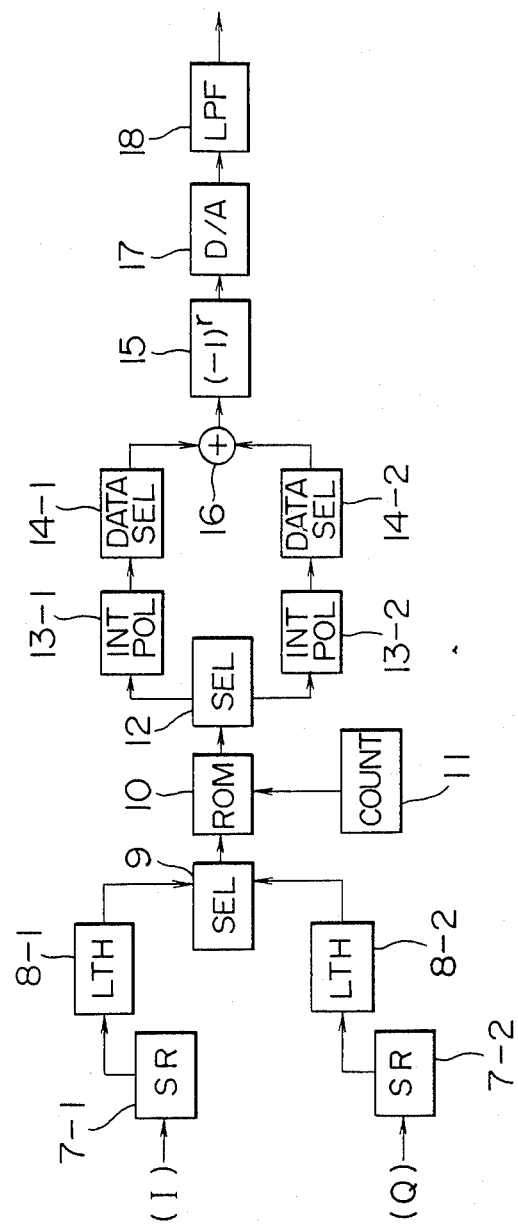

F I G. 5
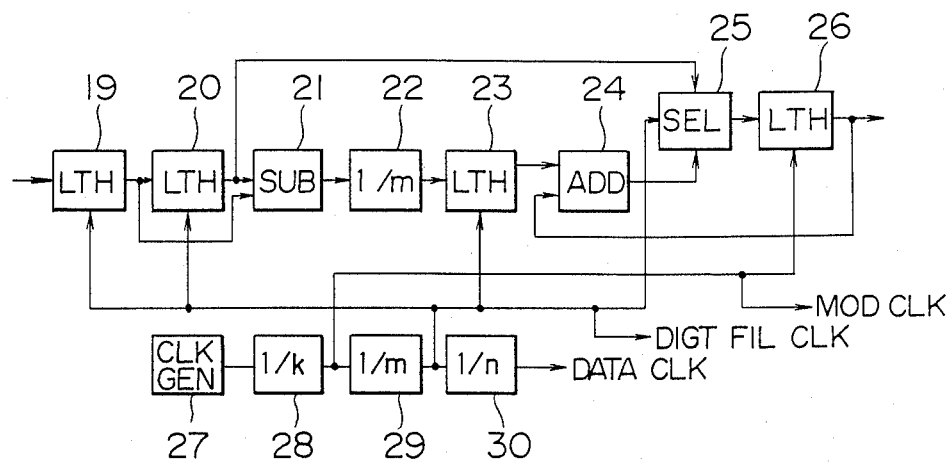
F I G. 6
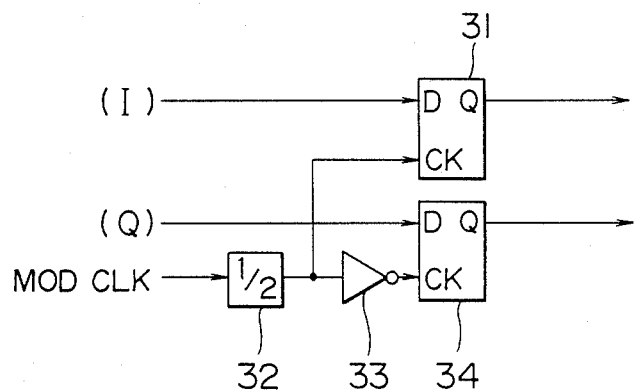

DIGITIZED QUADRATURE PHASE SHIFT KEYING MODULATOR

BACKGROUND OF THE INVENTION

This invention relates to a modulator used for quadrature phase shift keying and more particularly to a digitized quadrature phase shift keying modulator whose internal circuits are all realized with digital circuits.

A known method for replacing internal circuits of a quadrature phase shift keying modulator with digital circuits uses, as a digital filter for shaping the transmitting waveform, a digital filter using a look-up table. This digital filter has a read only memory (ROM) in which impulse responses of a filter have been stored in accordance with such factors as the modulation output frequency and sampling rate, and waveforms of a desired impulse response corresponding to an input digital signal are read out of the ROM and synthesized together through digital operations.

The known method, however, utilizes the impulse response of a filter which has been stored in the ROM at a predetermined sampling rate and therefore, the output frequency of the modulator is determined by a data rate of the input signal. More particularly, when the data rate of the input signal changes, the modulation output frequency also changes and in order to obtain a modulation output signal at a fixed frequency, the contents of the ROM must be rewritten.

Conversely, when the data rate of the input signal is fixed, only a modulation output signal at a constant frequency is obtained, requiring that the contents of the ROM be rewritten if the modulation output frequency is desired to be changed for a fixed input signal.

In order that the waveforms of impulse response of I data and Q data of quadrature phase shift keying which are 90° out of phase from each other can be delivered out of the digital filter for shaping at different timings from each other, it is necessary for the above known method to use separate or independent waveform shaping digital filters with a look-up table for I data and Q data.

For example, reference may be made to JP-A-59-207768 relevant to a method for realization of all the signal processings in internal circuits of the modulator with digital processings by using a digital filter with look-up table.

SUMMARY OF THE INVENTION

An object of this invention is to provide a digitized quadrature phase shift keying modulator capable of producing desired modulation output frequencies for various input data rates without rewriting the contents of the ROM of the digital filter using a look-up table.

Another object of this invention is to provide a digitized quadrature phase shift keying modulator capable of producing a modulation output signal at a fixed frequency even when the data rate of the input signal changes and conversely, capable of changing the data rate of the input signal under a condition that the modulation output frequency is fixed.

Still another object of this invention is to provide a digitized quadrature phase shift keying modulator capable of producing modulation output signals at desired frequencies under a condition that the data rate of the input signal is constant.

Further object of this invention is to provide a digitized quadrature phase shift keying modulator capable of employing a single digital filter using look-up table in common for I data and Q data.

According to the invention, to accomplish the above objects, the sampling interval used for two series of output impulse responses of the waveform shaping digital filter with look-up table corresponding to the input data I and Q of quadrature phase shift keying is re-sampled by means of interpolators. More particularly, an interval between adjacent sampling points in the output impulse response of n samples/symbol is interpolated with (m−1) data to multiply the sampling number by m (to 1/m divide the sampling period). After interpolation, there are (m×n) samples/symbol in the impulse response. The number of interpolations m can be selected suitably in accordance with the data rate of the input signal and the modulation output frequency.

Subsequently, each of the thus interpolated I data and Q data is extracted, at different timings for the I and Q data, in every other sampling period.

This ensures sequential alternate delivery of the I data and Q data at different timings, allowing the waveform shaping digital filters using look-up table to produce output signals for the I data and Q data at the same timing. Accordingly, the digital filters using look-up table can conveniently be replaced with a single digital filter with look-up table used in common for the data I and Q.

Finally, the extracted I and Q data are synthesized together to produce a digital quadrature phase shift keying signal.

BRIEF DESCRIPTION OF THE DRAWINGS

FIG. 1 is a block diagram illustrating a transmitter of radio communication system incorporating the invention.

FIG. 2 is a schematic block diagram of a digitized quadrature phase shift keying modulator according to a first embodiment of the invention.

FIG. 3 is a schematic block diagram of a digitized quadrature phase shift keying modulator according to a second embodiment of the invention.

FIG. 5 is a block diagram illustrating an example of an interpolator shown in the circuits of FIGS. 2 and 3.

FIG. 6 is a circuit diagram illustrating an example of a data selector shown in the circuits of FIGS. 2 and 3.

DESCRIPTION OF THE PREFERRED EMBODIMENTS

Figure 4A:
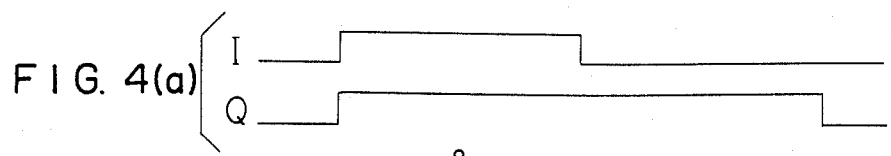
FIGS. 4a to 4f are diagrams showing waveforms developing at principal points of the FIG. 2 circuit which are analogous to analog signals.

Referring now to FIG. 1, there is illustrated, in block form, a transmitter of radio communication system incorporating a digitized quadrature phase shift keying modulator according to the invention.

A serial digital data signal is supplied from a data terminal 1 to a serial data to parallel data conversion circuit 2. The serial to parallel converter 2 converts the input serial data signal into a parallel digital data signal and produces I data and Q data of quadrature phase shift keying. The operation of the serial to parallel converter 2 is described in, for example, JP-A-54-133019.

A digitized quadrature phase shift keying modulator 3 according to the invention is connected to receive the I and Q data from the serial to parallel converter 2 and it prepares a quadrature phase shift keying signal through digital operations and then converts the quadrature phase shift keying signal into an analog waveform which is delivered out of the modulator. A frequency converter 4 converts the output quadrature phase shift keying signal waveform into a frequency signal suitable for transmission. An amplifier 5 then amplifies the frequency signal to produce a power output signal necessary for transmission which in turn is transmitted from an antenna 6.

The quadrature phase shift keying signal is transmitted through the operation described above.

The digitized quadrature phase shift keying modulator 3 will now be described in greater detail.

FIG. 2 shows schematically a digitized quadrature phase shift keying modulator according to an embodiment of the invention. The modulator comprises shift registers 7-1 and 7-2, latch circuits 8-1 and 8-2, a selector 9 for alternately fetching the I data and Q data, a ROM 10 of a digital filter using a look-up table, a counter 11 for driving the ROM, a selector 12 for dividing the output signal of ROM 10 into the I and Q data, interpolators 13-1 and 13-2 featuring the present invention, data selectors 14-1 and 14-2 for establishing alternate development of the I and Q data, code inversion circuits 15-1 and 15-2, an adder 16, a digital to analog converter 17, and a low-pass filter 18.

Waveforms developing at principal points of the FIG. 2 circuit are depicted analogously to analog signals in FIGS. 4a to 4f.

The I data and Q data having waveforms as shown in FIG. 4a are respectively supplied to the shift registers 7-1 and 7-2 each being of k bits and temporarily stored in the latch circuits 8-1 and 8-2 at the same timing. For example, the shift registers 7-1 and 7-2 may be constituted with SN74LS164 manufactured by TI (Texas Instruments) and the latch circuits 8-1 and 8-2 may be constituted with 74LS273 manufactured by TI.

The selector 9 receives the output signals from the latch circuits 8-1 and 8-2 to selectively fetch the I data and Q data alternately and delivers the data to addresses of the ROM 10 on the time division basis. This selector 9 may exemplarily be constituted with SN74LS157 manufactured by TI.

The ROM 10 has been written with impulse response output waveforms of a waveform shaping filter corresponding to the central one of k bits of the input signal and is operable to deliver an impulse response in accordance with an input address. Reference may be made to, for example, IEEE TRANSACTIONS ON COMMUNICATIONS, Vol. COM 25, No. 10, October 1977, pp 1242-1244 relevant to the above filter with look-up table using a ROM.

To improve accuracy of the waveform shaping digital filter, lower bits of the address on the ROM are controlled by the counter 11 so that the output in the sampling rate n (n being positive integer) per one bit of the input signal can be obtained, whereby waveforms of impulse response of n samples/symbol can be delivered out of the ROM 10. Exemplarily, the ROM 10 may be constituted with HN 27256 manufactured by Hitachi and the counter 11 with SN 74LS161 manufactured by TI.

The output signal from the ROM 10 of the waveform shaping digital filter is supplied to the selector 12 at which the I data and Q data are separated from each other. The selector 12 may exemplarily be constituted by two latch circuits (such as SN 74LS273) which respond to mutually phase-inverted clocks to fetch the I data and Q data alternately.

Figure 4B:
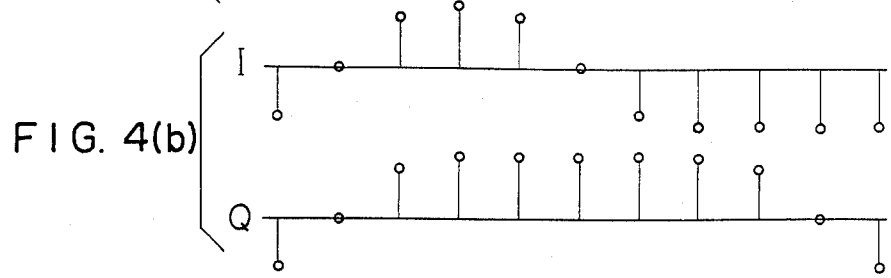

In response to input data of having waveforms as shown in FIG. 4a, the selector 12 provides output data having waveforms as illustrated in FIG. 4b. As an example, the value of n is assumed to be 4 in FIG. 4b, indicating that one cycle of the input data in FIG. 4a is sampled into four samples. For clarity of explanation, the digital signal is depicted analogously to analog signals in FIG. 4b and this holds true for FIGS. 4c to 4f.

In the circuit components preceding the selector 12, the output I data and Q data from the latch circuits 8-1 and 8-2 are alternately supplied to the ROM 10 by means of the selector 9, and the I and Q impulse responses are read out of the ROM 10 at the same timing on a time division basis. Thereafter, the selector 12 separates the I and Q data. Therefore, it should be understood that the single ROM 10 is sufficient for processing the I data and Q data.

Subsequently, the impulse responses of the I and Q data delivered out of the selector 12 are supplied to the interpolators 13-1 and 13-2. The interpolators 13-1 and 13-2 re-sample the input impulse responses to interpolate an interval between adjacent sampling points with $(m-1)$ data. After the interpolation, the sampling number is therefore multiplied by m to provide $(m \times n)$ samples/symbol, thus 1/m dividing the sampling period. Details of the interpolators 13-1 and 13-2 will be described later.

Figure 4C:
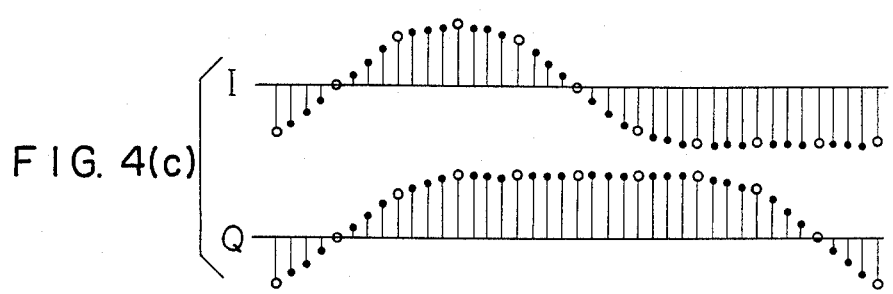

After the interpolation, the impulse responses have waveforms as shown in FIG. 4c. Assuming that the number of interpolations m is four, interpolated data are indicated by black dot-headed samples in FIG. 4c. The interpolated impulse responses of $(m \times n = 16)$ samples/symbol for the I and Q data occur at the same timing.

The data selectors 14-1 and 14-2 receive the interpolated impulse responses and respectively extract each of the interpolated I data and Q data on every other sampling period at different timings. The extracted I data and Q data are of a sampling rate of $(m \times n)/2$ and sequentially develop in out of phase relationship with each other.

Figure 4D:
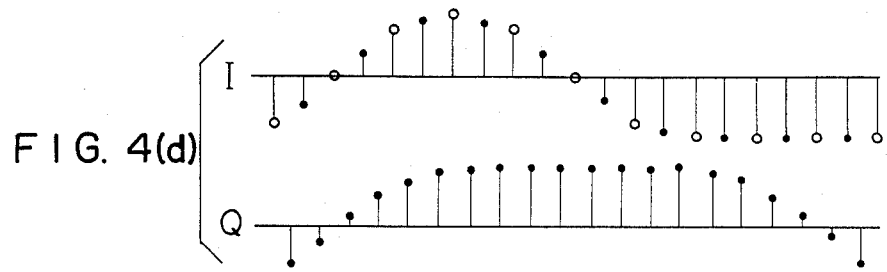

The extracted data have waveforms as shown in FIG. 4d, indicating that the sampling rate is eight for each of the I data and Q data.

The output signals of the data selectors 14-1 and 14-2 are supplied to the code inversion circuits 15-1 and 15-2, respectively. The code inversion circuits 15-1 and 15-2 effect code inversion of the input data on every other sampling period. Where the code format is of, for example, offset binary, the code inversion circuits 15-1 and 15-2 may be realized readily with circuits which invert the sign bit.

Figure 4E:
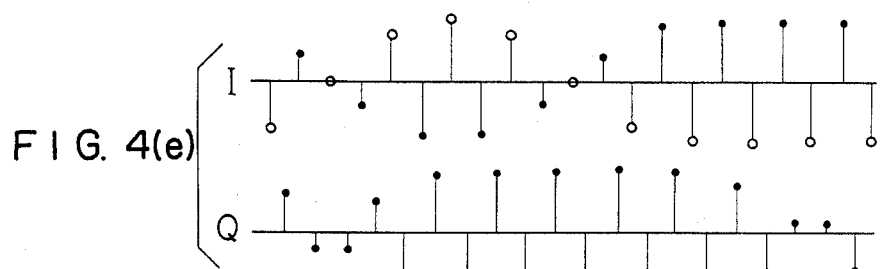

Output waveforms of the code inversion circuits 15-1 and 15-2 are illustrated in FIG. 4e. When making reference to the Q data in FIG. 4e, it will be seen that as a result of the code inversion on every other sampling period, continuous delivery of data of the same sign occurs at the time that the input data changes from positive to negative or vice versa.

The output signals of the code inversion circuits 15-1 and 15-2 are supplied to the adder 16 at which the I data and Q data are added together. For example, the adder 16 may be materialized with a selector such as SN 74LS157 manufactured by TI. Since each of the input I data and Q data is of a sampling rate of $(m \times n)/2$, the added output signal is of a sampling rate of $(m \times n)$.

Figure 4F:
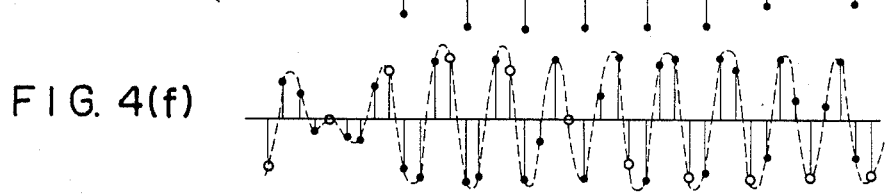

The added output signal from the adder 16 has a waveform as shown in FIG. 4f which is of a sampling rate of 16.

The output signal of the adder 16 undergoes digital to analog conversion at the digital to analog converter 17. Exemplarily, the digital to analog converter 17 may be constituted with HI 5618A manufactured by HARRIS.

Finally, the analog signal from the digital to analog converter 17 is removed of harmonic components by means of the low-pass filter 18 and delivered as a quadrature phase shift keying signal. Typically, the low-pass filter 18 includes a group of filters of the third to fifth order of Butter worth type and may readily be constituted with discrete parts.

The low-pass filter 18 produces an output waveform as indicated at dotted envelope curve in FIG. 4f.

In the modulator shown in FIG. 2, the output signals of the data selectors 14-1 and 14-2 are first subjected to code inversion on every other sampling period at the code inversion circuits 15-1 and 15-2 and thereafter are added together at the adder 16 so as to synthesize the I data and Q data. However, with the aim of synthesizing the I and Q data, the addition may alternatively precede the code inversion.

FIG. 3 illustrates another embodiment of modulator wherein the code inversion follows the addition. Referring to FIG. 3, the output signals of the data selectors 14-1 and 14-2 are directly supplied to the adder 16 for addition of the I data and Q data. The output signal of the adder 16 is then supplied to a code inversion circuit 15. The code inversion circuit 15 handles two samples of the input data as a set and performs code inversion of the input data every other set. Exactly, any adjacent two of the input data consist of one sample of I data and one sample of Q data. Therefore, the output data signal of code inversion circuit 15 undergoing the code inversion effected every other set exactly coincides with the output signal of the adder 16 of FIG. 2. The remaining components of the FIG. 3 embodiment are all identical with those of the FIG. 2 embodiment.

Details of the interpolators 13-1 and 13-2 will now be described.

FIG. 5 illustrates an example of each interpolator 13-1 or 13-2 used in FIGS. 2 and 3. This example is based on linear interpolation used for interpolating the interval between adjacent sampling points of the input data. The interpolator shown in FIG. 5 comprises latch circuits 19, 20, 23 and 26, a subtracter 21, a divider 22, an adder 24 and a selector 25. There is also illustrated in FIG. 5 a section for generating clock signals necessary for operating individual circuits, including a crystal oscillator 27 and frequency demultipliers 28, 29 and 30.

In operation, an impulse response of the I data or Q data from the selector 12 is supplied to the latch circuits 19 and 20. These latches 19 and 20 temporarily store the input data and then deliver output data. Data stored in the latch 20 one sample precede data stored in the latch 19.

The subtracter 21 receives the output signals of the latches 19 and 20 and computes a difference between the two. Specifically, the subtracter 21 computes a difference between two adjacent samples of the output signal of the selector 12.

The thus computed difference is supplied to the divider 22 at which the input data signal is divided by the number of interpolations m and a difference between adjacent interpolated data is determined. The latch circuit 23 temporarily stores values computed by the divider 22.

The adder 24 receives the output signal of latch 23 and the output signal of latch 26 representative of the interpolated data of the previous one sample and adds them together to apply an added output signal to the selector 25.

The selector 25 receives the output signal of the latch 20 and the interpolated data from the adder 24. Immediately after the input data to the interpolator have been stored in the latch circuits 19 and 20, the selector 25 first selects the output signal of the latch 20 and delivers it to the latch 26. Thus, the one sample preceding data signal is temporarily stored in the latch 20 and delivered therefrom as output data.

Subsequently, the selector 25 is switched to the adder 24 to select the output signal of the adder 24 and deliver it to the latch circuit 26. As a result, the adder 24 adds the preceding data stored in the latch 26 to the difference between adjacent interpolated data stored in the latch 23, and the sum is sent through the selector 25 to the latch 26 so as to be stored therein in place of the old data. The latch 26 temporarily stores the output signal of the selector 25 and then delivers it as interpolated data.

The above operation is $(m-1)$ times repeated and at the m-th operation, one sample succeeding new data is supplied to the latches 19 and 21 and a similar operation starts and repeats. In this manner, the interval between adjacent sampling points in the output impulse response from the selector 12 can be interpolated with $(m-1)$ data and the interpolated output data of $(m \times n)$ samples/symbol can be obtained.

The crystal oscillator 27 generates an original frequency signal necessary for generation of clocks required for driving individual components. The frequency demultiplier 28 1/k divides the clock from the crystal oscillator 27 to produce a clock of the same period as that of the data rate subject to interpolation and to supply it, as a latch pulse, to the latch circuit 26. Further, the frequency demultiplier 29 1/m divides the clock of the frequency demultiplier 28 to produce a clock of the same period as that of the output data of selector 12 not undergoing interpolation and to supply it to the latches 19, 20 and 23 and the selector 25. Further, the frequency demultiplier 30 1/n divides the clock of the frequency demultiplier 29 to produce a clock of the same period as that of the input data to the modulator.

Especially where the input data signal to the modulator is to be phase-locked by an external clock, the phase of the external clock may be compared with that of the output signal from the frequency demultiplier 30 and the crystal oscillator 27 may be phase-locked with the external clock by means of a phase lock loop circuit.

Exemplarily, the latch circuits 19, 20, 23 and 26 may be constituted with SN 74LS273 manufactured by TI, the subtracter 21 and adder 24 with SN 74LS83A manufactured by TI, and the selector 25 with SN 74LS157 also manufactured by TI. The SN 74LS161 manufactured by TI may exemplarily be used as the frequency demultipliers 28 to 30.

For illustration purpose only, the interpolators 13-1 and 13-2 are exemplarily based on the simplest linear interpolation but the present invention may adopt more sophisticated and accurate interpolation.

The data selectors 14-1 and 14-2 will now be described in greater detail.

FIG. 6 illustrates an example of the data selectors 14-1 and 14-2 used in FIGS. 2 and 3. The data selector exemplified herein comprises flip-flops 31 and 34, a frequency demultiplier 32 and a code inversion circuit 33. In FIG. 6, a flow of data of plural bits is represented by one channel of circuit.

In operation, the clock from the frequency demultiplier 28 in FIG. 5 is supplied to the frequency demultiplier 32 for ½ division. The code inversion circuit 33 inverts the output signal of the frequency demultiplier 32 so that clock signals of mutually inverting polarities are supplied to the flip-flops 31 and 32.

The flip-flop 31 fetches the input I data at the timing of the clock signal from the frequency demultiplier 32 and on the other hand, the flip-flop 32 fetches the input Q data at the timing of the clock signal from the code inversion circuit 33. Consequently, each of the I data and Q data is once fetched during time interval of two clocks in accordance with the clock signals which are 180° out of phase from each other. In this way, each of the I data and Q data can be extracted, at different timings, on every other sampling period and delivered out of the flip-flops 31 and 32.

For example, the flip-flops 31 and 32 and the frequency demultiplier 32 may be constituted with SN 74LS74 manufactured by TI and the code conversion circuit 33 with SN 74CS04 also manufactured by TI.

As described above, according to the digitized quadrature phase shift keying modulator of the present invention, since the output data waveforms of the waveform shaping digital filter are interpolated with a plurality of data and thereafter synthesized to produce the quadrature phase shift keying signal, the frequency of the modulation output signal can be determined desirably by setting the number of interpolations m to a desired value. Conversely, the modulation output frequency can be rendered constant by changing the number of interpolations m even when the data rate of the input data I and Q changes.

Especially where the sampling number n of the waveform shaping digital filter is 16 over one cycle of the input data for the input I and Q data rate being 16 Kb/s, 32 Kb/s, 48 Kb/s, 64 Kb/s, 96 Kb/s, 128 Kb/s and 256 Kb/s, the modulation output frequency can be determined to be 3.072 MHz by setting the number of interpolations m to 48, 24, 16, 12, 8, 6 and 3, respectively. The modulation output frequency can be changed to 6.144 MHz by doubling the number of interpolations m.

In an application of the modulator of this invention to radio channels, when the radio channel condition is degraded, the aforementioned performance can be utilized with advantage and the number of interpolations m can be changed to instantaneously decrease the data rate in order for channel quality to be maintained at a constant level. In another application wherein the modulator of this invention serves as a slave modulator used in common for a plurality of radio instrument master modulators operating at different data rates, the slave modulator can be exchanged with a master modulator when necessary with ease and inexpensiveness by changing the number of interpolations m such that the data rate of the slave modulator coincides with that of the master modulator.

Figure 7:
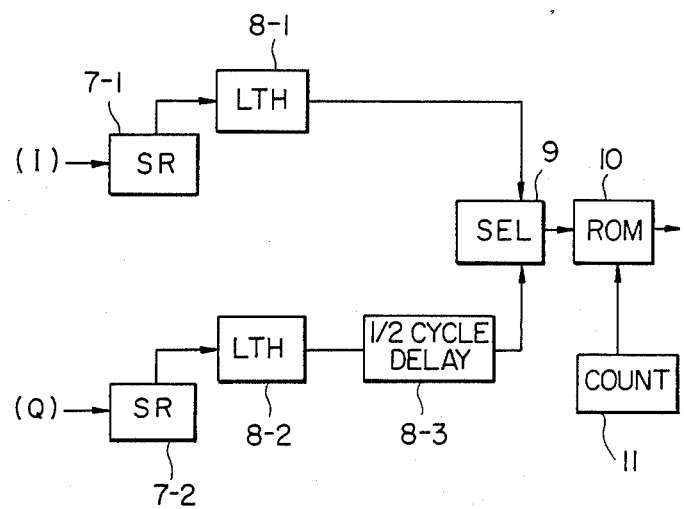
FIG. 7 is a schematic block diagram showing a modification adapted for offset-keyed quadrature phase shift keying modulation.

The present invention can also be applied to offset-keyed quadrature phase shift keying modulation in which the timing of any one of the input I data and Q data is delayed by half the fundamental cycle of the input data, as shown for example in FIG. 7. To this end, when the input I data and Q data are supplied to the shift registers 7-1 and 7-2 and their outputs are temporarily stored in the latch circuits 8-1 and 8-2, both the I data and Q data are not stored at the same timing but the timing for storage of any one of the I data and Q data, such as the Q data, is delayed by half the cycle of the input signal by the ½ cycle delay circuit 8-3, for example. Then, the n for prescribing the sampling by ROM 10 of one bit of the input data is selected to be an even number and the output signal of the counter 11 is inverted in timed relationship with the ½ cycle delayed data with the result that the output signal of the ROM 10 can readily be made compatible with the offset-keyed quadrature phase shift keying modulation. The following interpolation and data selection are carried out in the same manner as in the embodiments of FIGS. 2 and 3. In this way, the present invention can be adapted with ease for an offset-keyed quadrature phase shift keying modulator.

Obviously, the waveform shaping digital filter of this invention may be applied to minimum shift keying (MSK), modification of the offset-keyed quadrature phase shift keying modulation, by simply providing the ROM of the filter with contents which meet desired characteristics.

We claim:

1. A digitized quadrature phase shift keying modulator comprising:
    digital filter means including a look-up table for receiving as parallel data digital I data and digital Q data representing quadrature phase shift keying data and for generating impulse response waveforms represented by plural sampling points for each bit of the I data and Q data bit by bit;
    interpolating means for re-sampling each impulse response waveform of each of the I data and Q data generated from said digital filter means and for interpolating an interval between adjacent sampling points with I and Q data to thereby change the sampling rate;
    means for extracting, at different timings, each of the interpolated I data and Q data from said interpolating means at every other sample;
    means for synthesizing the extracted I data and Q data from said extracting means; and
    digital to analog converter means for converting the output digital data from said synthesizing means into an analog signal.

2. A digitized quadrature phase shift keying modulator according to claim 1 wherein said means for synthesizing the extracted I data and Q data comprises:
    code inversion means for effecting code conversion of each of the extracted I data and a Q data from said extracting means on every other sampling period; and
    an adder for adding together the code inverted I data and Q data from said code inversion means.

3. A digitized quadrature phase shift keying modulator according to claim 1 wherein said means for synthesizing the extracted I data and Q data comprises:
    an adder for adding together the extracted I data and Q data from said extracting means; and
    code inversion means for handing two samples of data from said adder as a set and for performing performing code inversion of the data for every other set.

4. A digitized quadrature phase shift keying modulator according to claim 1 wherein said interpolating means comprises:
   a subtractor for computing a difference between two adjacent samples of the I data or Q data from said digital filter;
   a divider for dividing the computed difference from said subtracter by the number of interpolations m;
   an adder connected to receive two inputs wherein one input is the dividing result of said divider for adding the one input to another input and then outputting the result of the addition; and
   selector means connected to receive the input of said subtractor and the output said adder for selectively outputting either said input of said subtractor or the output of said adder as an output sample value, said output sample value being fed back to said adder as said another input to be added to said dividing result.

5. A digitized quadrature phase shift keying modulator according to claim 1 wherein said extracting means comprises:
   a first flip-flop for fetching the interpolated I data from said interpolating means at a period which is half the re-sampling period; and
   a second flip-flop operative to fetch the interpolated Q data from said interpolating means at a timing which displaces by half the period of said first flip-flop.

6. A digitized quadrature phase shift keying modulator comprising:
   a first selector for sequentially fetching parallel data of digital I data and digital Q data of quadrature phase shift keying and delivering serial digital data;
   a digital filter with look-up table having a read only memory (ROM) for receiving at its addresses the output data from said first selector and sampling n times the received data bit by bit to generate waveforms of impulse response of n samples/symbol;
   a second selector for sequentially separating the impulse response waveforms of said digital filter sample by sample to provide I data and Q data;
   interpolating means for re-sampling each impulse responsive waveform of each of said I data and Q data generated from said second selector and interpolating an interval between adjacent sampling points with (m−1) data to produce impulse response waveforms of (m×n) samples/symbol, where m is an intergral number of divisions in an interpolation period;
   means for extracting, at different timings, each of the interpolated I data and Q data from said interpolating means every other sample;
   means for synthesizing the extracted I data and Q data from said extracting means; and
   a digital to analog converter for converting the output digital data from said synchronizing means into an analog signal.

7. A quadrature phase shift keying modulator according to claim 6 further comprising a circuit, preceding said first selector, for delaying one of the I data and Q data relative to the other by half the cycle, wherein the sampling number n of said digital filter is selected to be an even number.

* * * * *